(12) United States Patent
Park et al.

(10) Patent No.: US 7,537,187 B2
(45) Date of Patent: May 26, 2009

(54) COLLAPSIBLE FRAME STRUCTURES

(75) Inventors: Frederick K. Park, 901 Winstead Ave., Rocky Mount, NC (US) 27804; Paul Brad Forrest, Cary, NC (US)

(73) Assignee: Frederick K. Park, Rocky Mount, NC (US)

( * ) Notice: Subject to any disclaimer, the term of this patent is extended or adjusted under 35 U.S.C. 154(b) by 304 days.

(21) Appl. No.: 11/266,463

(22) Filed: Nov. 3, 2005

(65) Prior Publication Data
US 2007/0095990 A1 May 3, 2007

(51) Int. Cl.
*F16M 11/00* (2006.01)
(52) U.S. Cl. .................. 248/200; 74/501.5 R; 403/320
(58) Field of Classification Search .............. 248/200, 248/150, 155.4; 242/378.1, 388; 74/501.5 R; 403/320; 52/645; 135/123, 127, 145; 280/647
See application file for complete search history.

(56) References Cited

U.S. PATENT DOCUMENTS

| | | | |
|---|---|---|---|
| 933,285 A | 9/1909 | Blair | |
| 1,348,145 A | 8/1920 | Arden | |
| 2,601,409 A * | 6/1952 | McArthur et al. | ........ 242/396.1 |
| 2,705,015 A | 3/1955 | Langlais | |
| 2,743,068 A * | 4/1956 | Walker | ........ 242/388.8 |
| 3,203,285 A | 8/1965 | Schmidt | |
| 3,730,544 A | 5/1973 | Hyman | |
| RE28,067 E | 7/1974 | Hyman | |
| 4,167,354 A | 9/1979 | Walker | |
| 4,215,877 A | 8/1980 | Pritchett | |
| 4,236,711 A | 12/1980 | Klingbeil | |
| 4,539,786 A | 9/1985 | Nelson | |
| 4,706,696 A | 11/1987 | Gillis | |
| 4,827,958 A | 5/1989 | Cantwell et al. | |
| 5,423,341 A * | 6/1995 | Brady | ........ 135/139 |
| 5,538,214 A * | 7/1996 | Sinila | ........ 248/278.1 |
| 5,709,428 A | 1/1998 | Hugghins | |
| 5,930,971 A | 8/1999 | Etheridge | |
| 6,026,661 A * | 2/2000 | Spiropoulos | ........ 70/16 |
| 6,038,802 A | 3/2000 | Tidwell | |
| 6,062,648 A | 5/2000 | Adler | |
| 6,065,708 A * | 5/2000 | Matsubara | ........ 242/388.1 |
| 6,199,784 B1 * | 3/2001 | Wang et al. | ........ 242/378 |
| 6,325,243 B1 * | 12/2001 | Bennett | ........ 221/307 |
| 6,378,168 B1 | 4/2002 | Brady et al. | |
| 6,550,801 B1 * | 4/2003 | Newhard | ........ 280/642 |
| 6,557,572 B2 | 5/2003 | Lah | |
| 6,565,111 B2 * | 5/2003 | Ageneau | ........ 280/647 |
| 6,679,644 B1 | 1/2004 | Heller | |
| 6,722,618 B1 * | 4/2004 | Wu | ........ 248/166 |
| 2006/0102766 A1 * | 5/2006 | Chang et al. | ........ 242/378.1 |

* cited by examiner

*Primary Examiner*—Ramon O Ramirez
(74) *Attorney, Agent, or Firm*—Coats & Bennett, P.L.L.C.

(57) ABSTRACT

A collapsible frame comprises a plurality of frame members joined together by a flexible tension cable. In one embodiment, the individual frame members are also joined together by an elastic cord to facilitate assembly. The tensioning member includes an arcuate cable track and is rotatably connected to the frame. Relative rotation of the frame and tensioning member in a first direction tightens the tension cable, while relative rotation of the frame and tensioning member in a second direction loosens the tension cable.

14 Claims, 13 Drawing Sheets

COLLAPSIBLE FRAME STRUCTURES

BACKGROUND

The present invention relates generally collapsible frame structures, and more particularly to collapsible frame structures comprising a plurality of separable frame members held together by an internal cord or cable.

Collapsible frame structures comprising a plurality of frame members that are joined end-to-end and held together by a flexible cord or cable are known. For example, U.S. Pat. Nos. 6,557,572; 4,827,958; 4,706,696 disclose tent poles comprising pole sections held together by an elastic cord. The individual pole sections can be separated and folded over to form a compact bundle for storage. The elastic cord pulls the individual frame members together to facilitate assembly. Similar frame systems may be found in other types of devices as shown by U.S. Pat. No. 6,038,802 (portable displays); U.S. Pat. No. 4,215,877 (folding utility carts); and U.S. Pat. No. 6,062,648 (folding chairs). Frame structures that rely on an elastic cord to hold the individual sections together are easily assembled but limited in the loads that can be supported.

It is also known to use an inelastic cable, such as a steel cable, to tension a multi-part frame structure as shown in U.S. Pat. Nos. 5,930,971 and 4,167,354. In these patents, a tension cable runs interiorly through individual frame members joined end-to-end and is tightened by means of a tensioning device after the frame is assembled to strengthen the frame. Frames that use an inelastic tension cable can support greater loads, but are not as easily assembled. Further, the tensioning devices tend to be cumbersome to operate.

Accordingly, there is a need for a collapsible frame structure that can support relatively heavy loads, and yet remain easy to assemble.

SUMMARY

The present invention relates to a collapsible frame structure comprising a plurality of frame members that are connected end-to-end and held together by a flexible member. One aspect of the invention comprises the use of first and second flexible members to interconnect a plurality of frame members. The first flexible member comprises an elastic cord that facilitates assembly by pulling together the individual frame members. The second flexible member comprises an inelastic cable that is tensioned during assembly of the frame to add strength to the frame. Another aspect of the invention comprises the design of the tensioning member. The tensioning member includes an arcuate cable track and is rotatably connected to the frame. Relative rotation of the frame and tensioning member in a first direction tensions the cable, while relative rotation of the frame section and tensioning member in a second direction loosens said cable.

DETAILED DESCRIPTION

Figure 1:
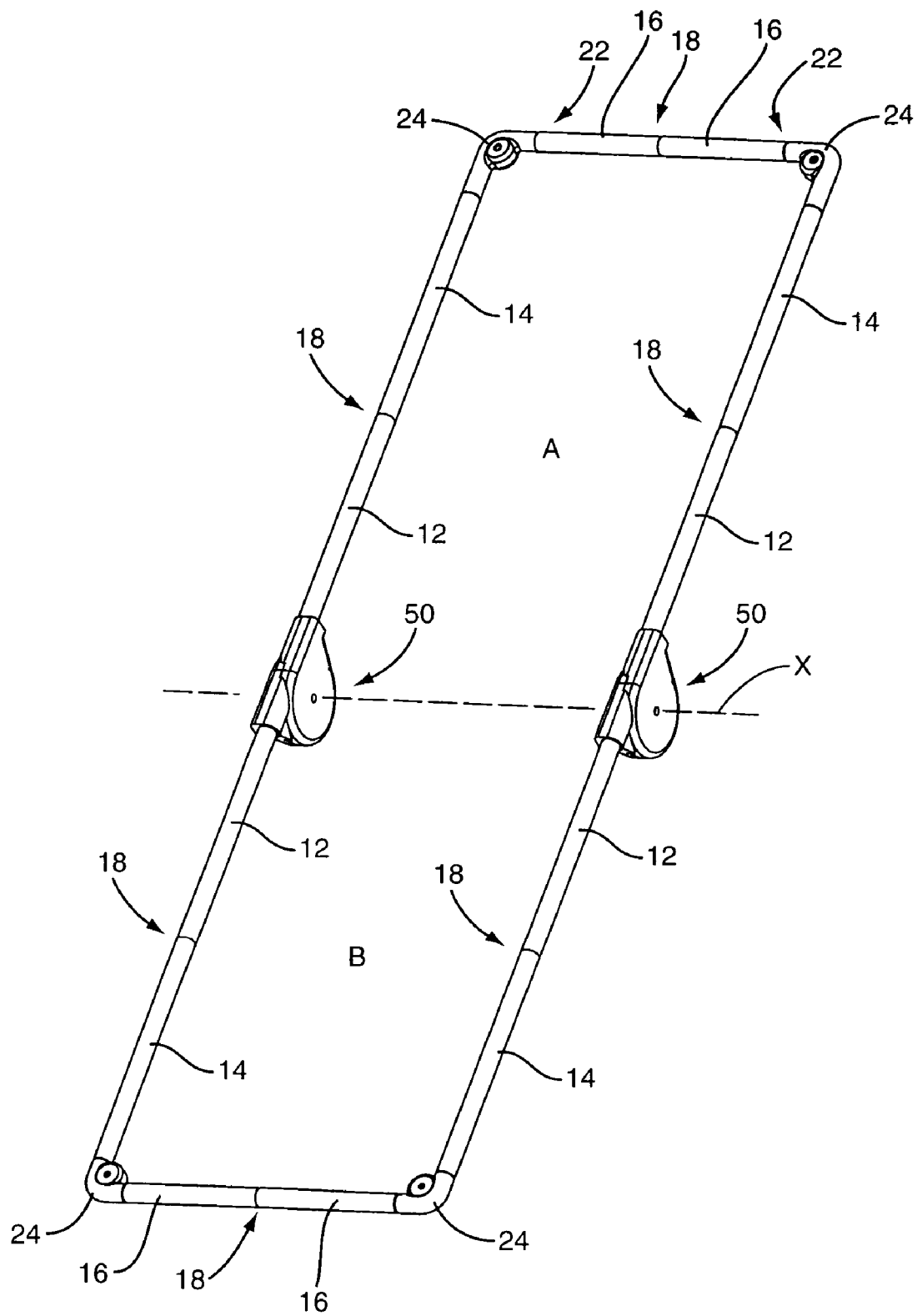
FIG. 1 is a perspective view of a collapsible frame structure in an unfolded position.

Referring now to the drawings, FIG. 1 illustrates an exemplary frame structure indicated generally by the numeral 10. Frame structure 10 comprises twelve tubular frame members indicated generally by the numerals 12, 14 and 16, four corner connectors 24, and two tensioning devices 50. Two frame members 12 are connected to each tensioning device 50 and extend outwardly from the tensioning device 50 in opposite directions. Frame members 14 connect in end-to-end fashion with the frame members 12 to form the sides of the frame structure 10. Two frame members 16 join end-to-end to form each end of the frame structure 10. Frame members 16 are connected at a 90 degree angle to respective frame members 14 by the corner connectors 24.

In one exemplary embodiment of the invention, the frame structure 10 comprises two u-shaped frame sections labeled as respectively as frame section A and frame section B. In other embodiments, the frame may be divided into more than two sections. For example, the frame 10 could be divided into four sections. In the illustrated embodiment, the two frame sections are pivotally connected to one another so as to pivot about an axis X. Each frame section comprises two frame members 12, two frame members 14 and two frame members 16. For convenience, letter suffixes a and b are used in the following description to distinguish similar components in different sections of the frame structure 10 where needed for clarity. For example, frame member 12 for frame section A may be referred to as frame member 12*a* when needed to distinguish it from the frame members 12 in frame section B. The letter suffix is not used when referring generally to components of a particular type and it is not necessary to distinguish components in frame section A from components in frame section B.

The frame members 12, 14 and 16 in each frame section are held together by one or more flexible members. In the exemplary embodiment, each frame section has two flexible members; an elastic cord 30 and a tension cable 32. The elastic cord 30 and tension cable 32 extend interiorly through the frame members 12, 14 and 16. The opposing ends of the elastic cord 30 and tension cable 32 for each section are connected to respective tensioning devices 50. There is one elastic cord 30 and one tension cable 32 for each frame section. The elastic cord 30 and tension cable 32 may be bound together at selected points by ties (not shown) such that the elastic cord 30 helps pull the tension cable 30 from the tensioning devices 50 when the frame 10 is collapsed.

As will be described in more detail below, the elastic cord 30 facilitates assembly of the frame structure 10 by pulling the frame members 12, 14 and 16 together. However, the elastic cord 30 does not impart sufficient strength to the frame structure 10 for load bearing structures. The tension cable 32 is a flexible and generally non-elastic cable, such as a steel or carbon fiber cable, that is tensioned during assembly of the frame structure 10 to impart added strength to the frame structure needed for load bearing structures. The elastic cord 30 and tension cable 32 also hold the frame sections 12, 14 and 16 loosely together when the frame structure 10 is disassembled or collapsed so that the parts will not be separated and lost.

Figure 2:
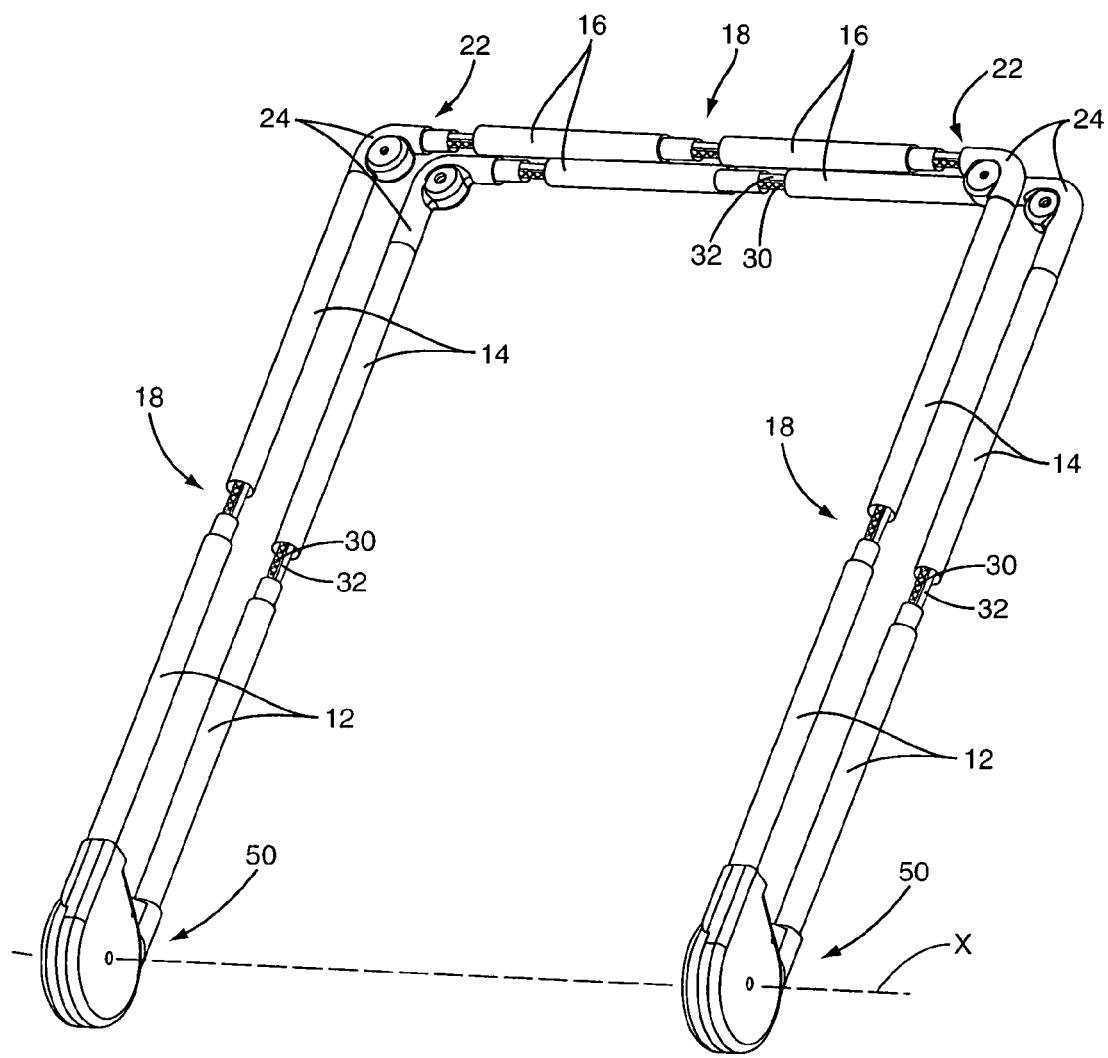
FIG. 2 illustrates the collapsible frame structure folded with the joints separated.
Figure 14:
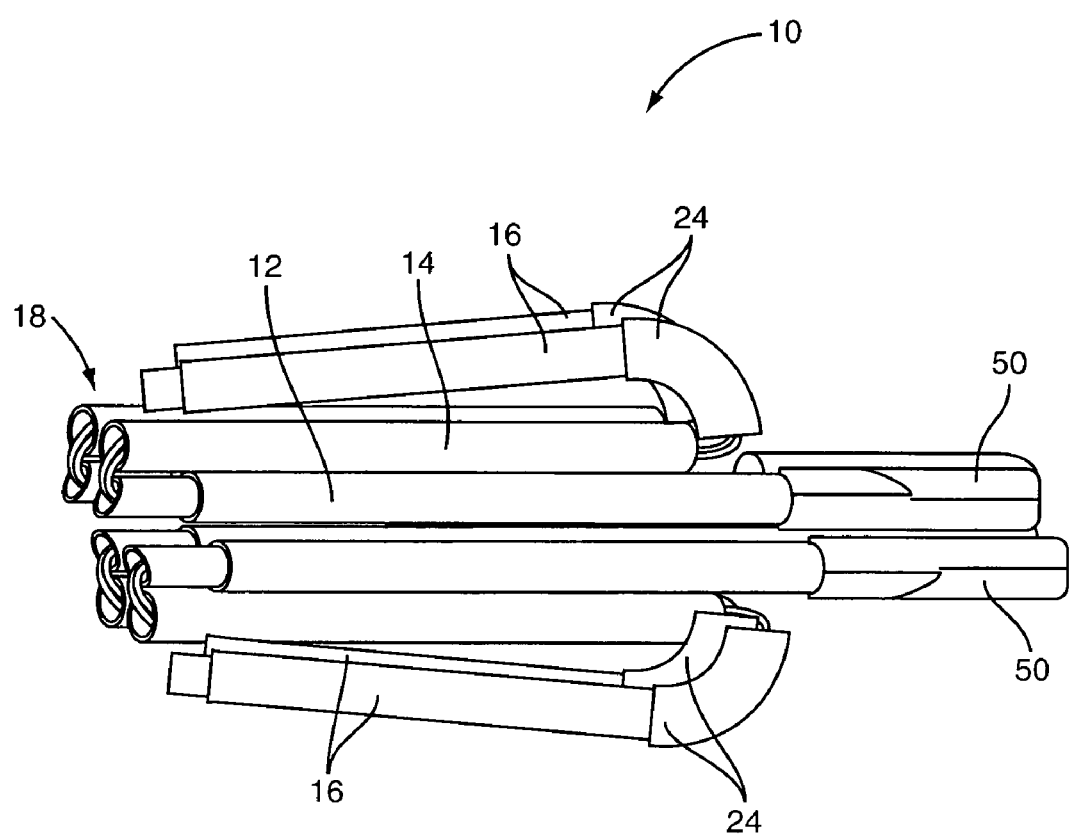
FIG. 14 is perspective view showing the frame collapsed.

FIG. 2 illustrates the frame structure 10 folded in half with the joints separated. As will be described in more detail below, the act of folding the frame structure 10 in half creates slack in the tension cable 32, allowing the joints of the frame to be separated. Once the joints are separated, the entire frame structure can be collapsed to form a bundle, as shown in FIG. 14. Those skilled in the art will appreciate that separating the joints stretches the elastic cord 30.

Figure 3A:
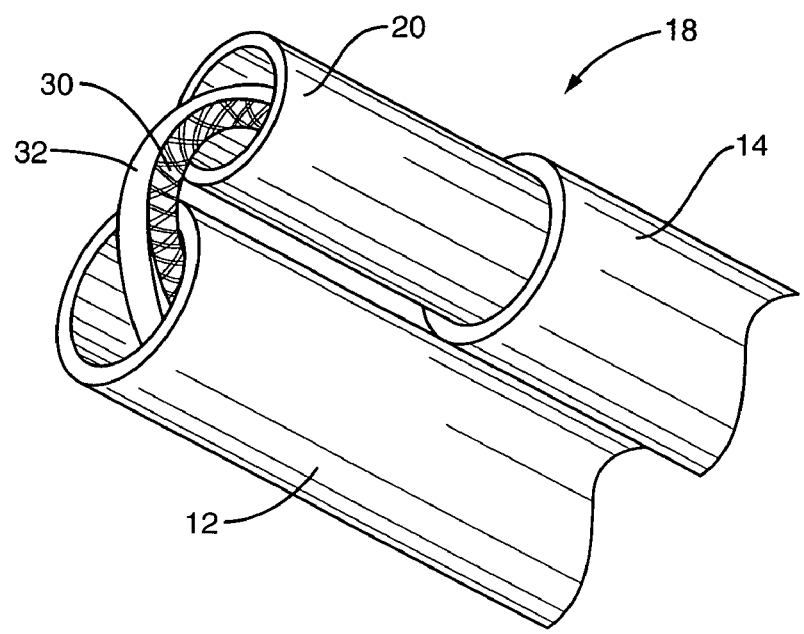
FIGS. 3A-3C illustrate exemplary straight joints between frame members.
Figure 3B:
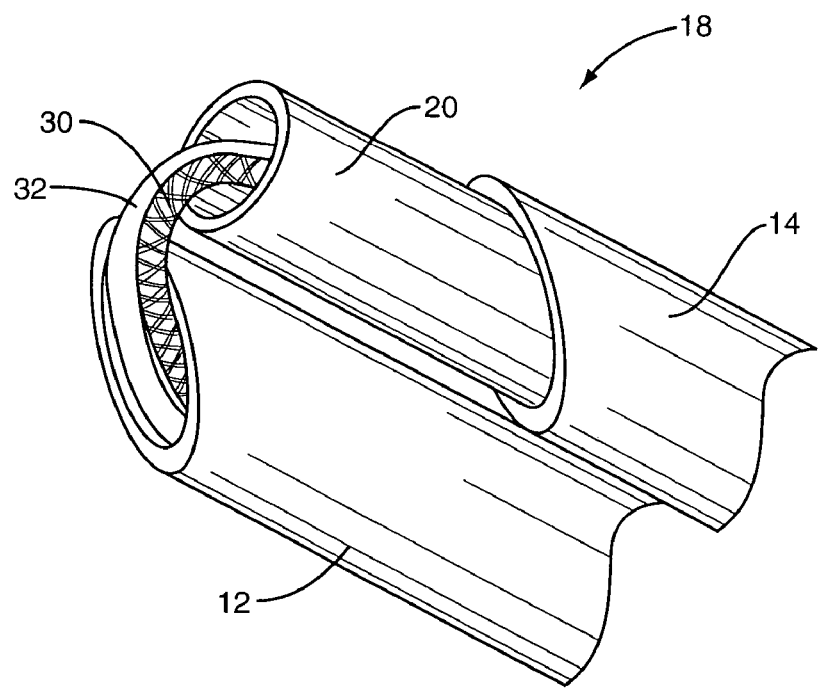
Figure 3C:
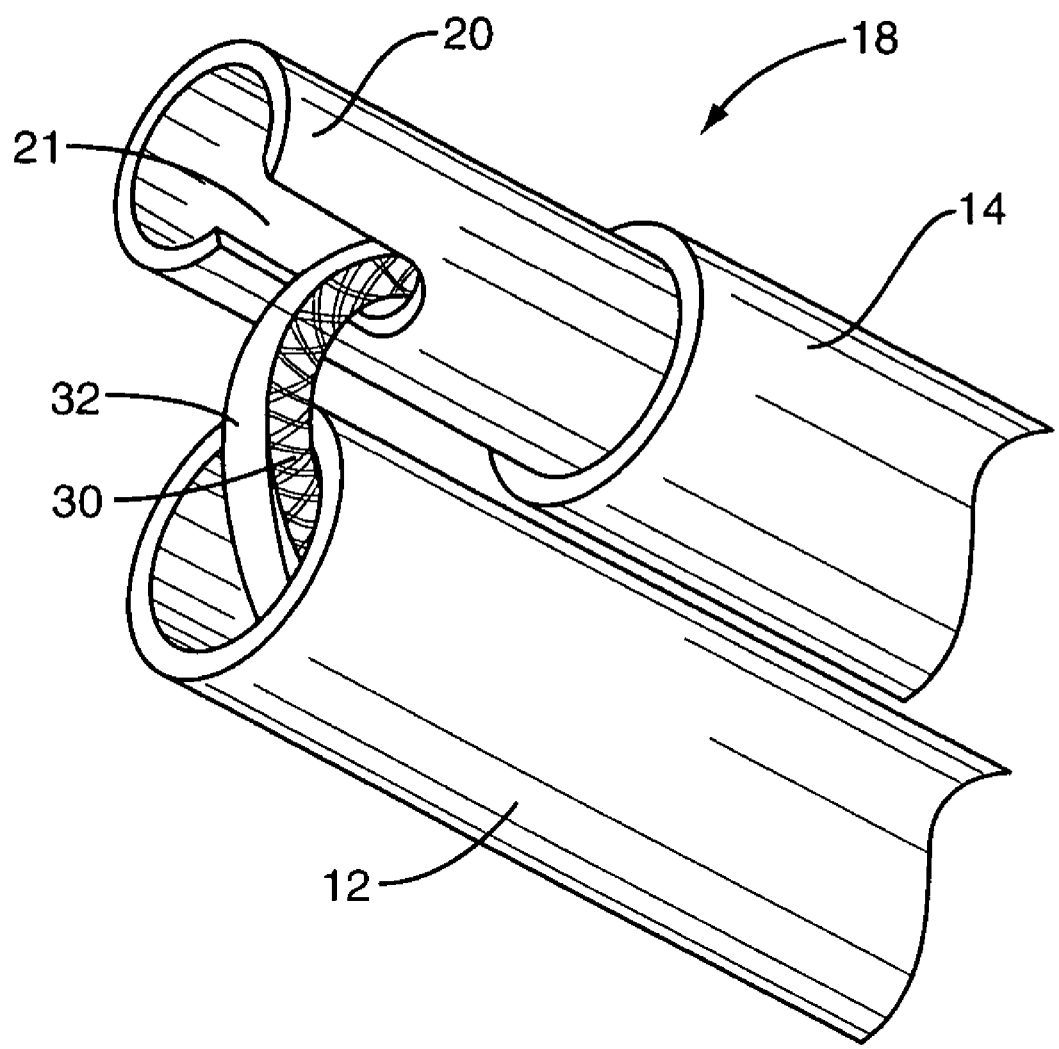

FIGS. 3A-3C illustrate exemplary straight joints 18 between frame members 12 and 14. The same joint 18 may be used to join two frame members 16 at each end of the frame structure 10. A sleeve 20 is fixed at the end of frame member 14. The sleeve 20 extends from the end of frame member 14 and inserts into the end of frame member 12. Alternatively, the sleeve 20 could be fixed to frame member 12 and insert into the end of frame member 14. The ends of the frame members 12 and 14 may be cut at an angle as shown in FIG. 3B to prevent relative rotation between frame members 12 and 14. Elastic cord 30 and tension cable 32 pass through the connection between frame members 12 and 14. When the frame structure 10 is disassembled for storage, the frame members 12 and 14 are pulled apart and folded side by side. The sleeve 20 may have a cut-out or slot 21 formed therein as shown in FIG. 3C. The presence of the slot 21 reduces the amount of slack that needs to be created to collapse the frame structure 10.

Figure 4:
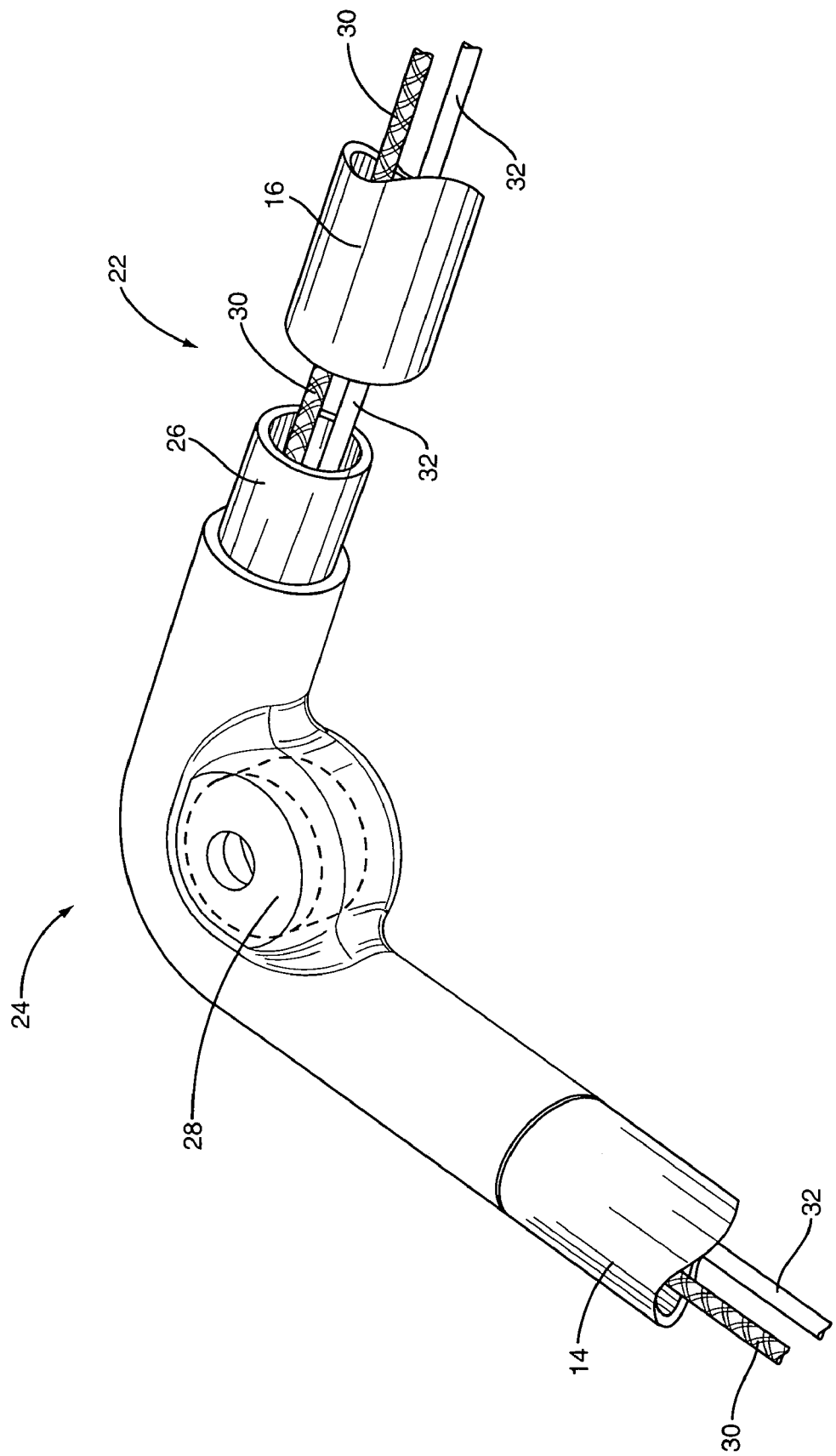
FIG. 4 illustrates a first exemplary corner joint between frame members.

FIG. 4 illustrates an exemplary corner joint 22 connecting frame members 14 and 16. A corner connector 24 is fixed to the end of frame section 14. Corner connector 24 includes a sleeve 26 that inserts into the end of frame section 16. Alternatively, sleeve 26 could be fixed to frame member 16 and insert into the end of frame member 16. Elastic cord 30 and tension cable 32 pass through the connection between the corner connector 24 and frame member 16. The corner connector 24 may include a guide pulley 28 to guide the tension cable 32 through the corner connector 24.

Figure 5:
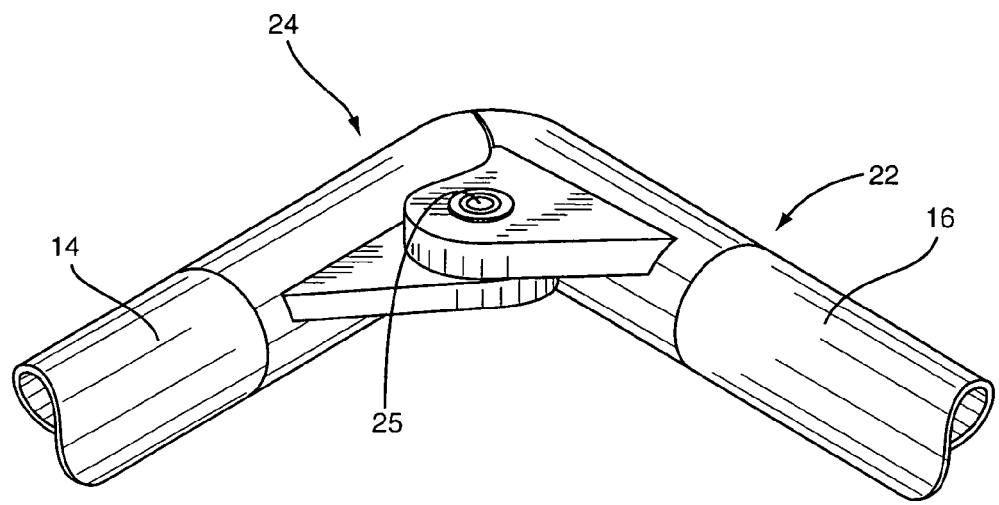
FIGS. 5 and 6 illustrate a second exemplary corner joint between frame members.
Figure 6:
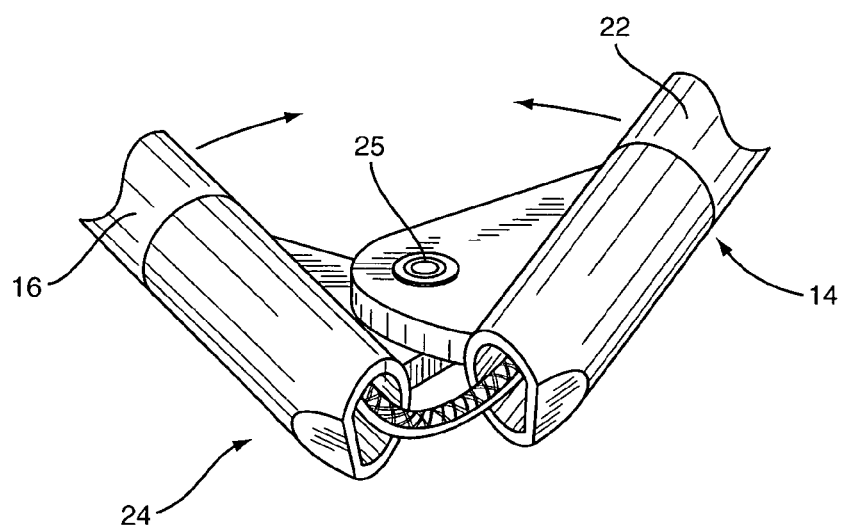

FIGS. 5 and 6 illustrate an alternative design for the corner connector 24. In this design, the corner connectors 24 comprise first and second sections that are pivotally connected by a pivot 25. FIG. 5 illustrates the corner connector 24 in an unfolded position. When the frame structure 10 is collapsed, the first and second sections fold inward as shown in FIG. 6.

Figure 7:
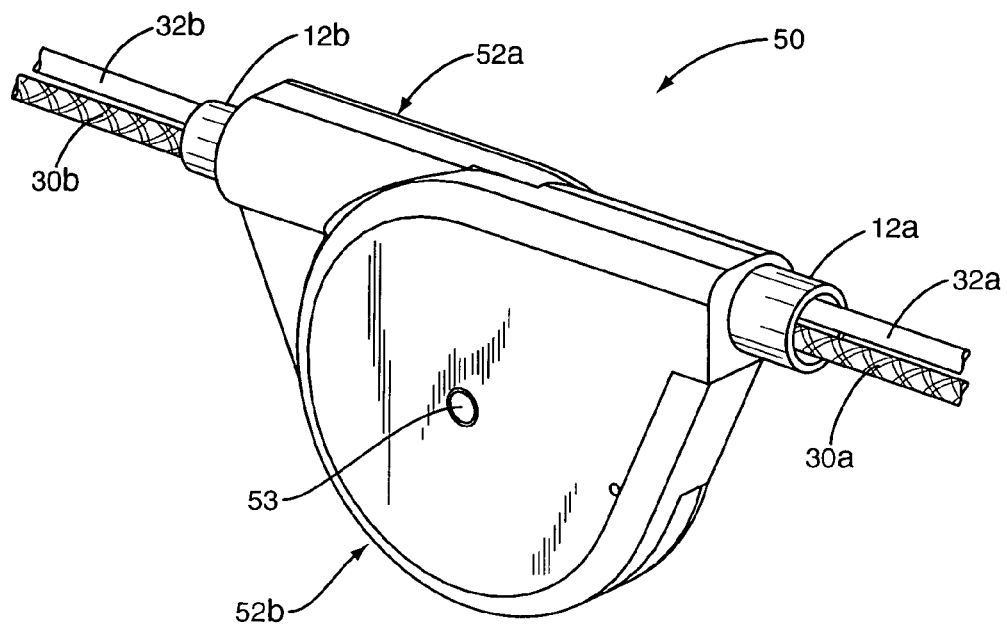
FIGS. 7 and 8 are perspective views of a tensioning device comprising two tensioning members in the unfolded and folded positions respectively.
Figure 8:
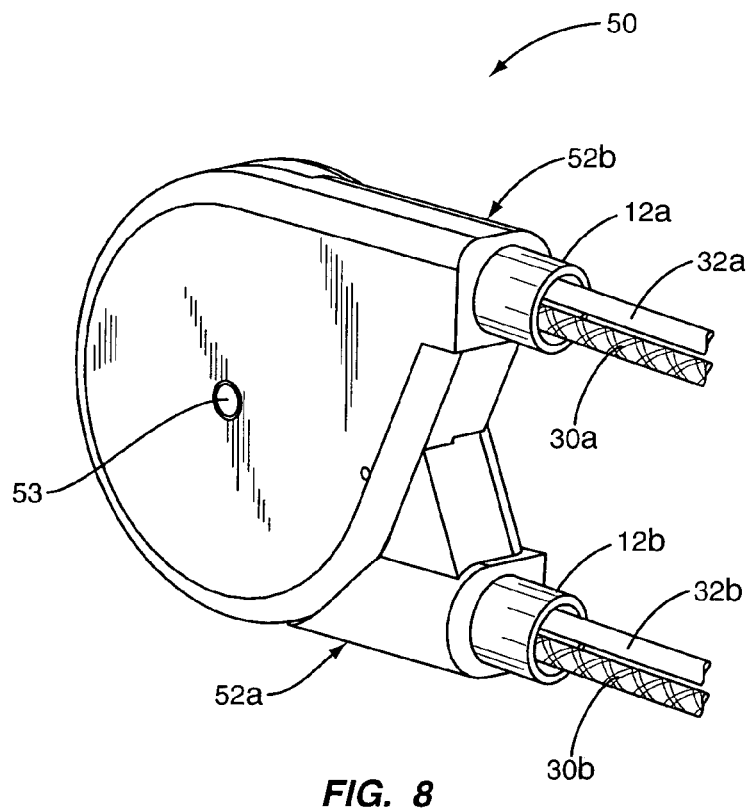

FIGS. 7 and 8 illustrate the tensioning device 50. Tensioning device 50 tightens the tension cable 32 in each frame section during assembly of the frame structure 10 to add strength to the frame structure 10. The tensioning device 50 comprises two tensioning members 52a and 52b that are pivotally connected. The tensioning members 52a and 52b rotate about a pivot member 53 between an unfolded position shown in FIG. 7 and a folded position shown in FIG. 8. Frame member 12a connects to tensioning member 52b and frame member 12b connects to tensioning member 12a. Thus, tensioning member 52a rotates relative to frame member 12a and tensioning member 52b rotates relative to frame member 12b.

Figure 9:
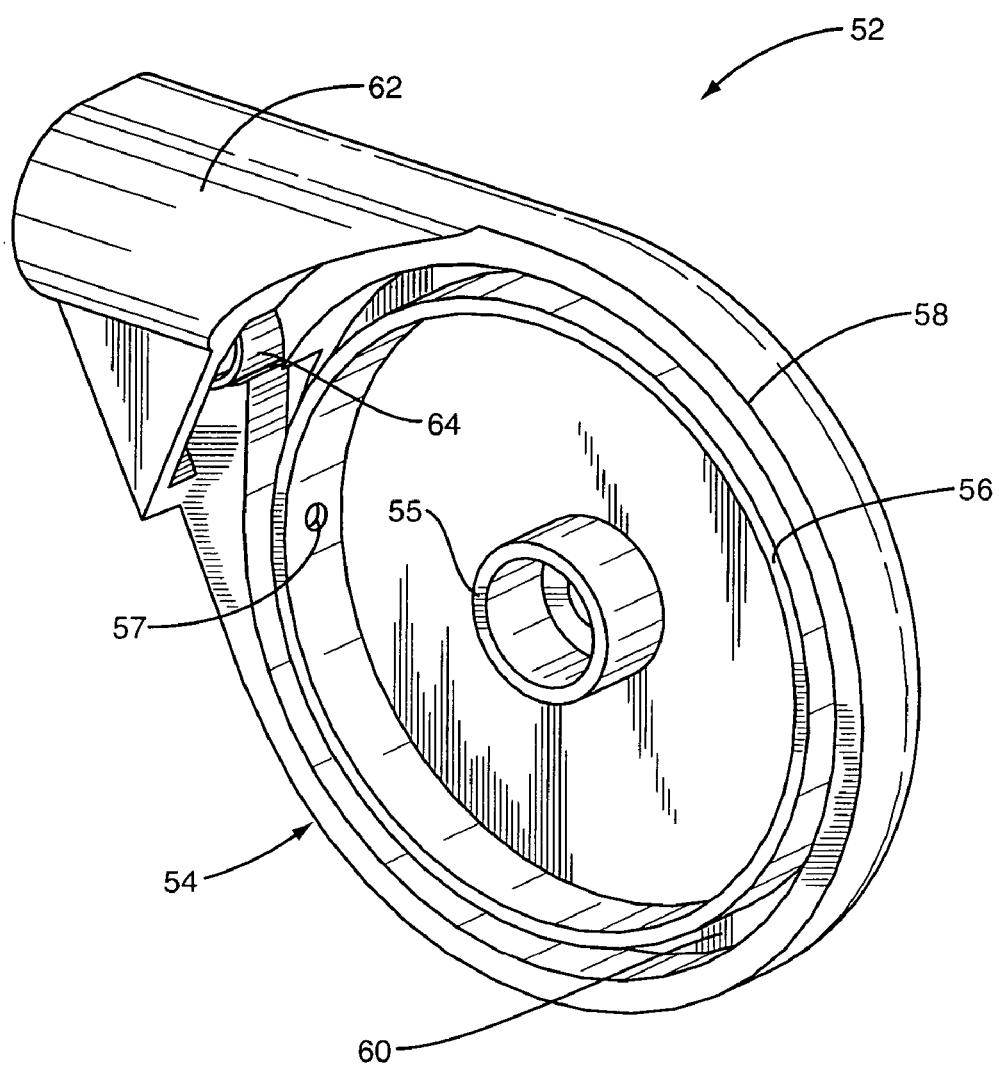
FIG. 9 is a perspective view of one tensioning member for the tensioning device shown in FIGS. 7 and 8.

FIG. 9 is a perspective view illustrating one tensioning member 52. Tensioning member 52 comprises a rotatable housing 54 including a connector 62 for connecting the tensioning member 52 to a respective frame member 12. The housing 54 may be a unitary member formed of thermoplastic, metal, or metal alloy. The rotatable housing 54 is generally circular in shape and includes a hub 55, an inner wall 56 and outer wall 58. The inner wall 56 and outer wall 58 define a circular cable track 60 to accommodate a tension cable 32. An opening 57 in the inner wall 56 receives the end of the tensioning cable 32 to secure the tension cable 32 to the tensioning member 52. A guide pulley 64 may be provided to guide the tension cable 32 into the cable track 60 of the mating tensioning member 52 to reduce friction and wear.

Figure 10:
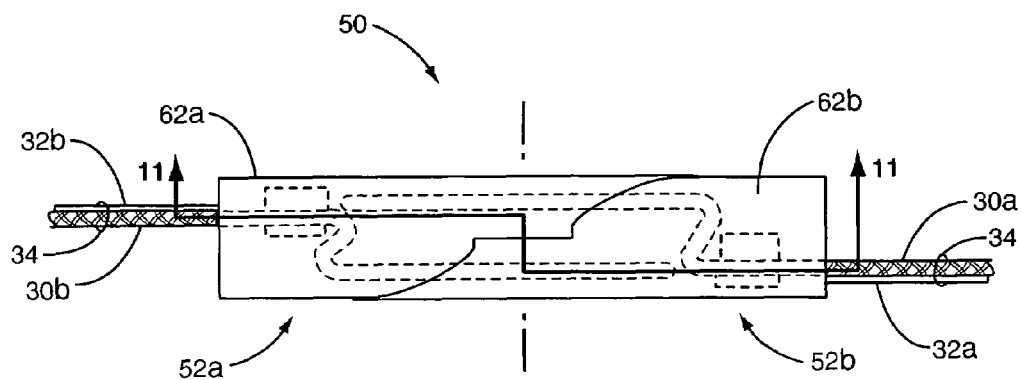
FIG. 10 is a top view of the tensioning device in an unfolded position.
Figure 11:
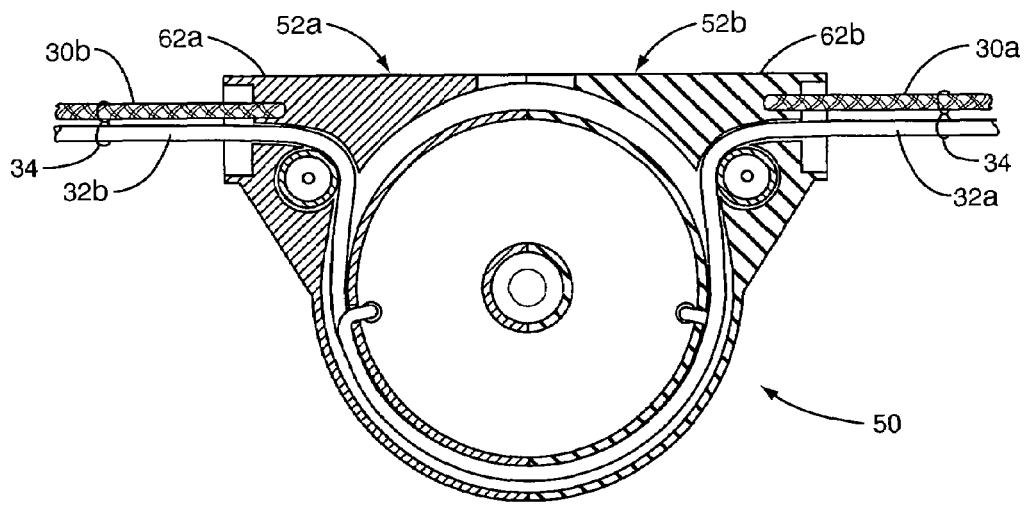
FIG. 11 is a section view of the tensioning device in the unfolded position taken through line 11-11 of FIG. 10.
Figure 12:
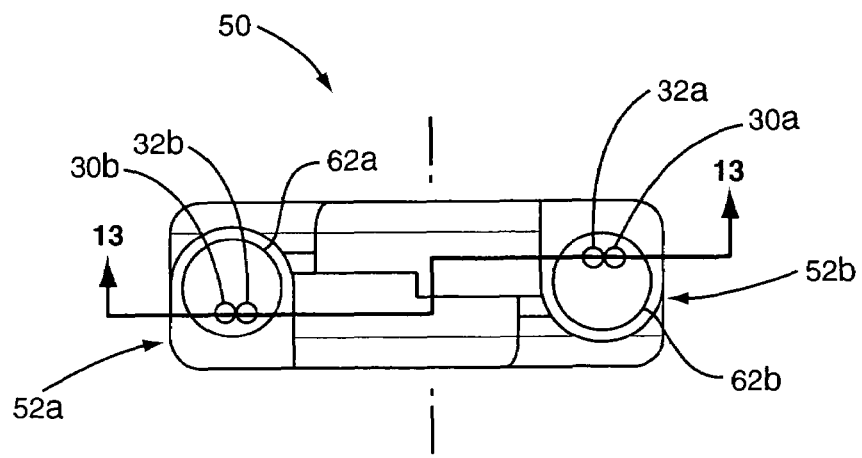
FIG. 12 is an end view of the tensioning device in a folded position.
Figure 13:
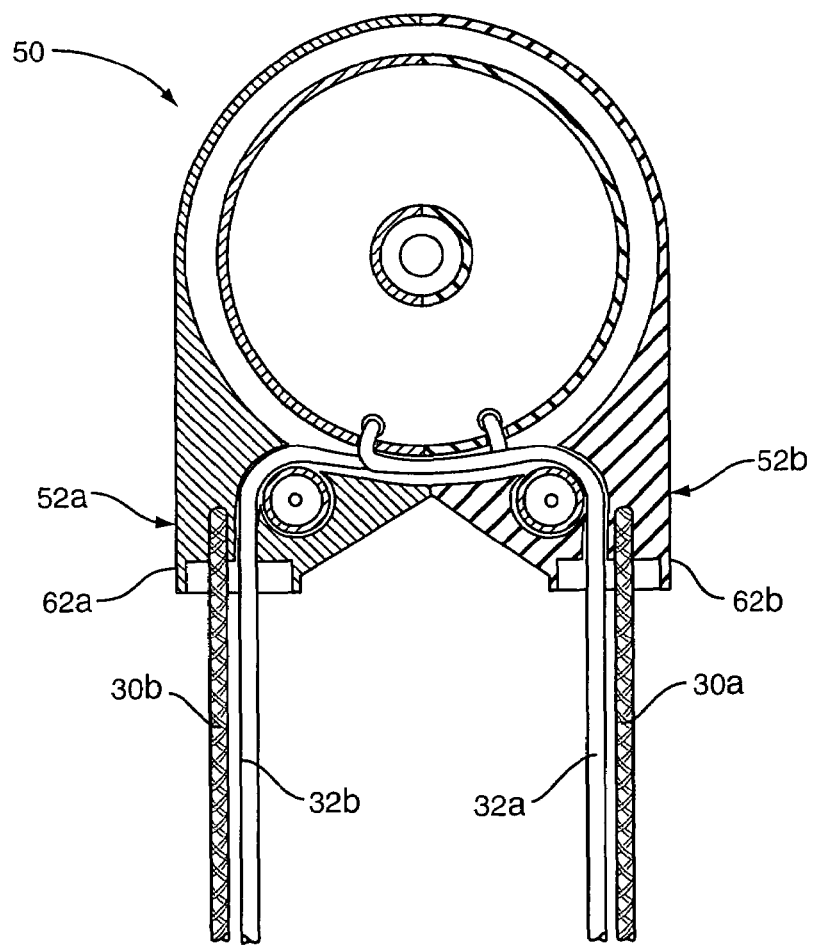
FIG. 13 is a section view of the tensioning device in the folded position taken through line 13-13 of FIG. 12.

FIGS. 10 and 11 illustrate the tensioning device 50 in an unfolded position. FIGS. 12 and 13 illustrate the tensioning device 50 in a folded position. Tension cable 32a for frame section A enters the connector 62b of tensioning member 52b, crosses over into tensioning member 52a, and passes around the cable track 60a of tensioning member 52a. The end of tension cable 32a passes through opening 57 in the inner wall 56 of tensioning member 52a and is secured to the tensioning member 52a. Similarly, tension cable 32b enters the connector 62a of tensioning member 52a, crosses over into tensioning member 52b, and passes around the cable track 60b of tensioning member 52b. The end of tension cable 32b is secured to the tensioning member 52b in a similar manner. The cross-over of the cables from one tensioning member 52 to another is shown best in FIG. 10.

When the tensioning members 52 are in the disassembled or folded position shown in FIG. 11, the tension cables 32 travel only a small distance around the cable tracks 60 of respective tensioning members 52. When the tensioning members 52 are in the assembled or unfolded position shown in FIG. 10, the tension cables 32 travel more than 180 degrees around the cable tracks 60 of respective tensioning members 52 removing slack from the tension cable 32. Thus, rotation of the tensioning devices 52 in a first direction tightens the cables 32, while rotation in the opposite direction slackens or loosens the cables.

FIG. 14 illustrates a disassembled frame structure 10. When disassembled, the components of the frame structure 10 can be folded to form a bundle as shown in FIG. 2. To disassemble the frame structure 10, the frame structure 10 is first folded in half along the transverse axis X of the frame structure 10 as shown in FIG. 2. The act of folding the frame structure 10 loosens the tension cables 32. After the frame structure is folded in half, the frame members 12, 14 and 16 can then be pulled apart and arranged side-by-side to make a bundle. The disassembled frame structure 10 can be secured with strap, or placed in a bag. The process is reversed to assemble the frame structure 10.

To assemble the frame, the individual frame members 12, 14, and 16 are arranged as shown in FIG. 2. The elastic cord 30 will then pull the frame members 12, 14, and 16 together. Once the frame members are pulled together, the two frame sections can be moved to the open position shown in FIG. 1. Moving the frame sections to the open position shown in FIG. 1 removes the slack from the tension cable 32. A latch or other locking mechanism may be used to lock the frame sections in the open position.

In the illustrated embodiment, each frame section includes a separate tension cable 32 and elastic cord 30. In other embodiments, a single elastic cord 30 and tension cable 32 for both frame sections could be used. The ends of the elastic cord 30 and tension cable 32 do not necessarily need to be fixed to the tensioning member 52. Instead, the end of either the elastic cord 30 or tensioning cable 32 could be terminated in one of the frame members 12, 14, or 16.

Those skilled in the art will recognize that the frame structure described above represents only one exemplary embodiment and that many variations thereof may be used. For example, the frame structure 10 may have more than two folding frame sections. FIG. 13 illustrates a frame structure 10 including three frames sections, which may be used, for example, in a chair or stroller. Also, some of the frame members 12, 14, and 16 may be pivotally connected. In FIG. 14 illustrates an embodiment wherein the frame members 16 at either end of the frame structure 10 are connected by a hinge 19. Also, the number of elastic cords 30 and tension cables 32 can be varied. For example, four elastic cords 30 and four tension cables 32 may be used in the embodiment shown in FIG. 14.

The frame structure 10 can be used in an almost endless variety of structures such as tents and canopies, chairs and tables, strollers, luggage carriers, utility carts, beds and cots, displays, canes and walkers.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A collapsible frame comprising:
   two or more frame members adapted to be joined to form a frame;
   an elastic cord extending interiorly through said frame members for pulling said frame members together when the frame members are aligned to facilitate assembly of the frame; and
   a non-elastic tension cable extending interiorly through said frame members; and
   a tensioning device connected to said tension cable for tensioning said tension cable when the frame is assembled to enhance the strength of the assembled frame.

2. The collapsible frame according to claim 1 wherein the tensioning device is rotatable and includes an arcuate track to receive said tension cable, and wherein said tension cable extends around said arcuate track such that rotation of said tensioning device in a first direction tensions said tension cable and wherein rotation of said tensioning device in a second direction loosens said tension cable.

3. The collapsible frame of claim 1 comprising two frame sections pivotally connected to one another.

4. The collapsible frame of claim 3 wherein each frame section includes a tension cable and wherein said tensioning device tensions both of said first and second tension cables.

5. The collapsible frame of claim 4 wherein the tensioning device pivotally connects said first and second frame sections.

6. The collapsible frame of claim 4 wherein said tensioning device includes first and second tensioning members rotatably connected to one another for tensioning respective ones of said tension cables.

7. The collapsible frame of claim 4 wherein each frame section includes a tension cable and a tensioning member.

8. The collapsible frame of claim 7 wherein the tensioning members for each frame section are rotatably connected to one another.

9. A tensioning device for removing slack from a cable, said tensioning device comprising:
   a housing including first and second rotatable housing sections;
   a cable entry for allowing a cable to enter said housing;
   an arcuate cable track within said housing around which said cable passes;
   a guide pulley in said housing to guide said cable into said cable track; and
   said cable track and cable entry arranged such that relative rotation of said housing sections in a first direction removes slack from said cable, and that relative rotation of said housing sections in a second direction introduces slack into said cable.

10. A tensioning device for removing slack from a cable, said tensioning device comprising:
    a housing including first and second rotatable housing sections;
    a first cable entry for allowing a first cable to enter said housing;
    a second cable entry for allowing a second cable to enter said housing;
    a first and second arcuate cable tracks within said housing around which said cables pass; and
    said cable tracks and cable entries arranged such that relative rotation of said housing sections in a first direction removes slack from said cables, and that relative rotation of said housing sections in a second direction introduces slack into said cables.

11. The tensioning device of claim 10 wherein each cable is fixed at one end to a respective housing section.

12. The tensioning device of claim 10 wherein each cable enters said housing through a respective cable entry in a respective housing section and passes around the cable track in the opposite housing section.

13. The tensioning device of claim 12 wherein each cable is fixed at one end to a respective housing section.

14. The tensioning device of claim 13 further comprising a pair of guide pulleys mounted to respective housing sections to guide said cables into said cable tracks.

* * * * *

UNITED STATES PATENT AND TRADEMARK OFFICE
CERTIFICATE OF CORRECTION

| | | |
|---|---|---|
| PATENT NO. | : 7,537,187 B2 | Page 1 of 1 |
| APPLICATION NO. | : 11/266463 | |
| DATED | : May 26, 2009 | |
| INVENTOR(S) | : Park et al. | |

Figure 15:
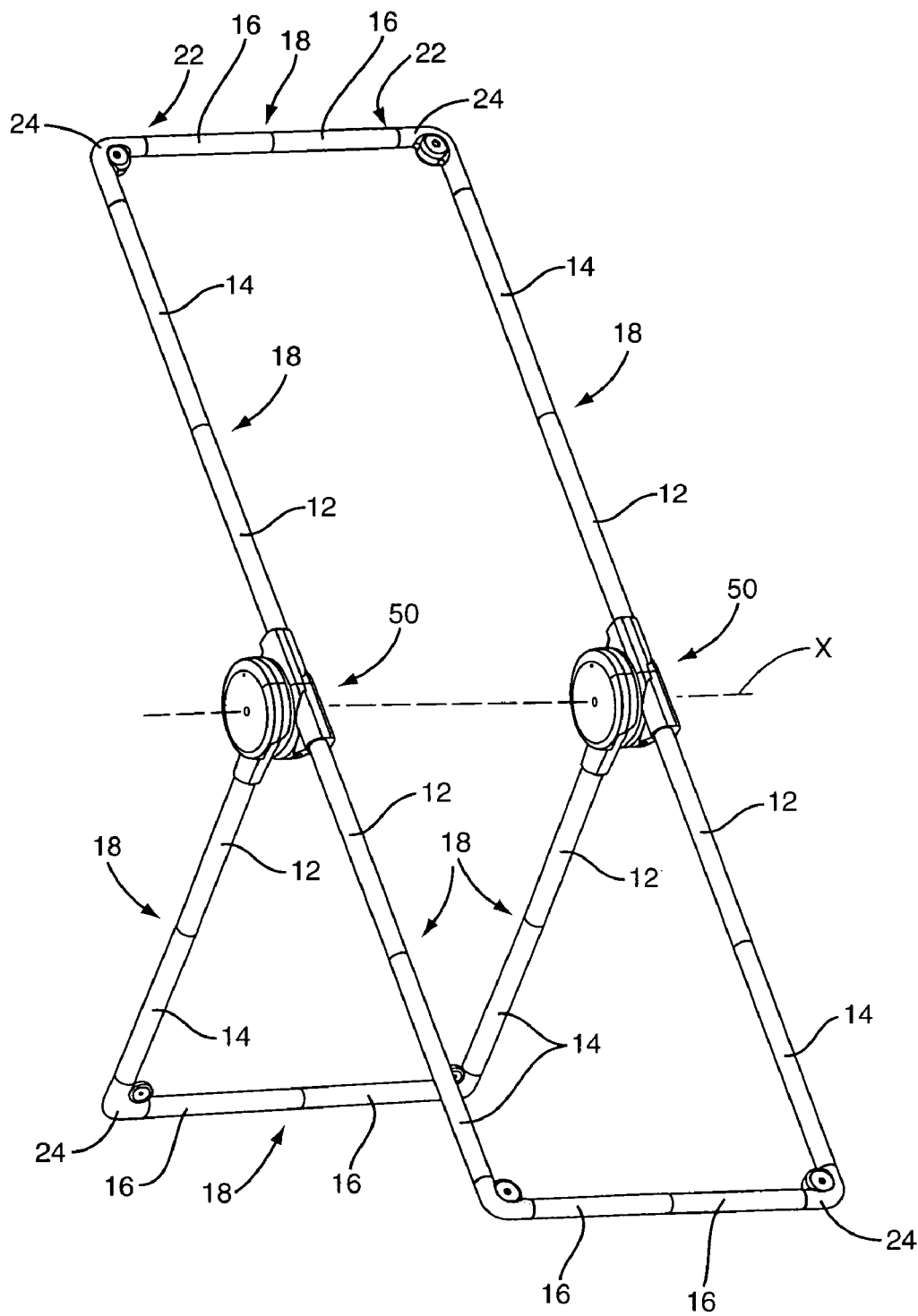
FIG. 15 is a perspective view of a second embodiment of a collapsible frame structure.

It is certified that error appears in the above-identified patent and that said Letters Patent is hereby corrected as shown below:

Col. 5, line 10, change "FIG. 13" to -- FIG. 15 --

Figure 16:
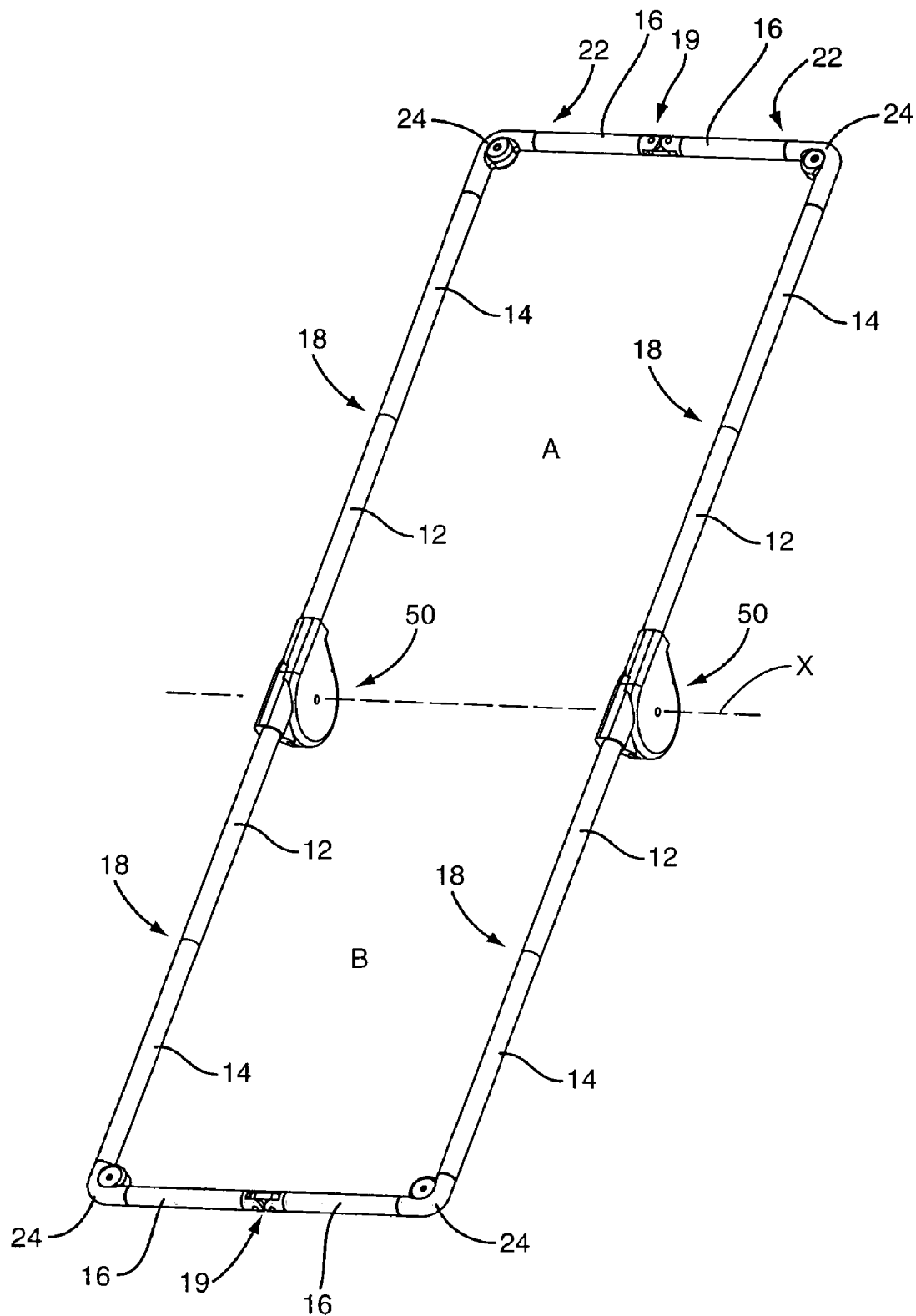
FIG. 16 is a perspective view of a third embodiment of a collapsible frame structure.

Col. 5, line 13, change "FIG. 14" to -- FIG. 16 --

Col. 5, line 19, change "FIG. 14" to -- FIG. 16 --

Signed and Sealed this

Eighteenth Day of August, 2009

David J. Kappos
*Director of the United States Patent and Trademark Office*